(12) United States Patent
Schumacher

(10) Patent No.: US 6,891,345 B2
(45) Date of Patent: May 10, 2005

(54) ACTUATOR WITH AN ELECTRIC MOTOR

(75) Inventor: Axel Schumacher, Bühl (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 10/311,953

(22) PCT Filed: May 22, 2001

(86) PCT No.: PCT/DE01/01605
§ 371 (c)(1),
(2), (4) Date: Dec. 19, 2002

(87) PCT Pub. No.: WO02/03154
PCT Pub. Date: Jan. 10, 2002

(65) Prior Publication Data
US 2003/0137262 A1 Jul. 24, 2003

(30) Foreign Application Priority Data
Jun. 30, 2000 (DE) .......................................... 100 31 920

(51) Int. Cl.⁷ ............................................... H02P 7/00
(52) U.S. Cl. ....................... 318/432; 318/434; 318/567; 318/254
(58) Field of Search ................................ 318/599, 811, 318/810, 434, 432, 433, 600, 567, 560, 254, 138, 439

(56) References Cited

U.S. PATENT DOCUMENTS 4,456,865 A * 6/1984 Robertson et al. .......... 318/599
6,237,563 B1 * 5/2001 Froehlich et al. .......... 123/350

FOREIGN PATENT DOCUMENTS

| DE | 40 31 816 | 4/1991 |
| DE | 43 14 211 | 11/1994 |
| DE | 195 03 492 | 8/1996 |
| DE | 198 40 572 | 3/2000 |

* cited by examiner

*Primary Examiner*—Karen Masih
(74) *Attorney, Agent, or Firm*—Kenyon & Kenyon

(57) ABSTRACT

An actuating drive including an electronically commutated electric motor which operates with a position-dependent summed torque and which, using a torque controller and a controlled system, is able to be adjusted to a selectable, torque-dependent setpoint value according to a continuously increasing torque-time characteristic curve. The torque controller is able to have supplied to it a torque-dependent actual value of the electric motor in addition to the set point value to derive a control signal. A positioning control is subordinate the torque control, the positioning control providing that the minima between the maxima of the summed torque are rapidly and reliably passed and the electric motor is stopped in the region of a maximum.

5 Claims, 3 Drawing Sheets

ACTUATOR WITH AN ELECTRIC MOTOR

FIELD OF THE INVENTION

The present invention relates to an actuating drive including an electronically commutated electric motor which operates with a position-dependent summed torque and which, using a torque controller and a controlled system, is able to be adjusted to a selectable, torque-dependent setpoint value according to a continuously increasing torque-time characteristic curve, the torque controller is able to have supplied to it a torque-dependent actual value of the electric motor in addition to the set point value to derive a control signal.

BACKGROUND INFORMATION

In electric motors with position-dependent motor torque, a lowering of the summed torque is provided exactly in the overlap region of the phases which, from a certain torque level on, may no longer be compensated for by increasing the phase current, if the electric motor is configured as a switched reluctance motor. In other motor topologies, the motor torque-position characteristic shows alternating minima and maxima, the maxima occurring at the positions at which only one phase of the electric motor is energized, respectively.

The minima lie in the overlap regions between two successively energized phases. In this context, both phases are energized, but generate motor torques whose sum is smaller than the maximum motor torque generated by one phase.

When the position of the motor rotor is slowly and continuously changed, then the stopping position may coincide with a minimum of the motor torque-position characteristic in the adjusted end position. In the case of high load torque and large static friction, the electric motor may no longer reliably start from this position of a minimum.

Moreover, in the case of a large setpoint torque and a slow change of the torque during the actuating operation, there is a risk for the electric motor to stop while passing through a minimum of the summed torque due to the load torque and the friction.

SUMMARY OF THE INVENTION

It is an object of the present invention to guarantee in an actuating drive with electric motor of the type mentioned at the outset that, at all times, an end position is reached which ensures reliable starting of the actuating drive in response to a new control input even in the case of high load torque and large static friction.

This object of the present invention may be achieved by providing a torque controller that emits the control signal as a setpoint position and feeds it to a downstream position controller. Until a predetermined threshold torque which is smaller than the maximum torque of the electric motor is reached, the setpoint position may be fed unchanged to the position controller and is used together with the actual position of the electric motor to derive the control signal for the controlled system. Subsequent to exceeding the threshold torque, the setpoint position may be fed to the position controller as a changed setpoint position until the predetermined setpoint position is reached, the changed setpoint position repeatedly increasing in an abrupt manner according to the increase in the following peak values of the increasing summed torque.

Using the additional positioning control, the electric motor may be always brought to an end position in the region of a maximum of the torque-position characteristic and thus, is started with nearly maximum motor torque during subsequent restarting. Thus, high load torque and large static friction are reliably overcome and positive starting of the electric motor is guaranteed.

Moreover, due to the abrupt changes of the changed setpoint position, it is achieved that, from the predetermined threshold torque on, the minima of the summed torque are rapidly and reliably passed as the setpoint values increases, and the next position of the following maximum is adjusted until, finally, the end position which corresponds to the setpoint value is reached.

A typical application of the actuating drive is given in an electromotively operated brake of a motor vehicle. In this context, the electric motor is started from an operating point which yields a high torque and the braking force is slowly increased. In this context, the electric motor, which controls the brake caliper, has to close the brake caliper further against the already high return torque of the brake. Using the control according to the present invention, it is possible to increase the end force by about 8% and, at the same, to reduce the current input from the electrical system of the motor vehicle by approximately one third.

According to one exemplary embodiment, the threshold torque is selected to be about 70% of the maximum torque of the electric motor.

In this context, the further increase of the changed setpoint position subsequent to exceeding the threshold torque is configured in such a manner that after each abrupt increase of the changed setpoint position its value remains constant until the unchanged setpoint position which is associated with the following maximum of the summed torque is reached, and then changes abruptly again.

Consequently, the changed setpoint position is a function of the position signal of the torque controller, of the predetermined threshold torque, and of the torque-dependent setpoint value.

The control loop may be configured in such a manner that a computing circuit, which is able to have supplied to it the control signal of the torque controller as a setpoint position and the setpoint value, is inserted between the torque controller and the position controller. The computing circuit converts the setpoint position to the changed setpoint position as a function of the setpoint position and the setpoint value, taking into account the threshold torque, and feeds it to the position controller.

DETAILED DESCRIPTION

Figure 1:
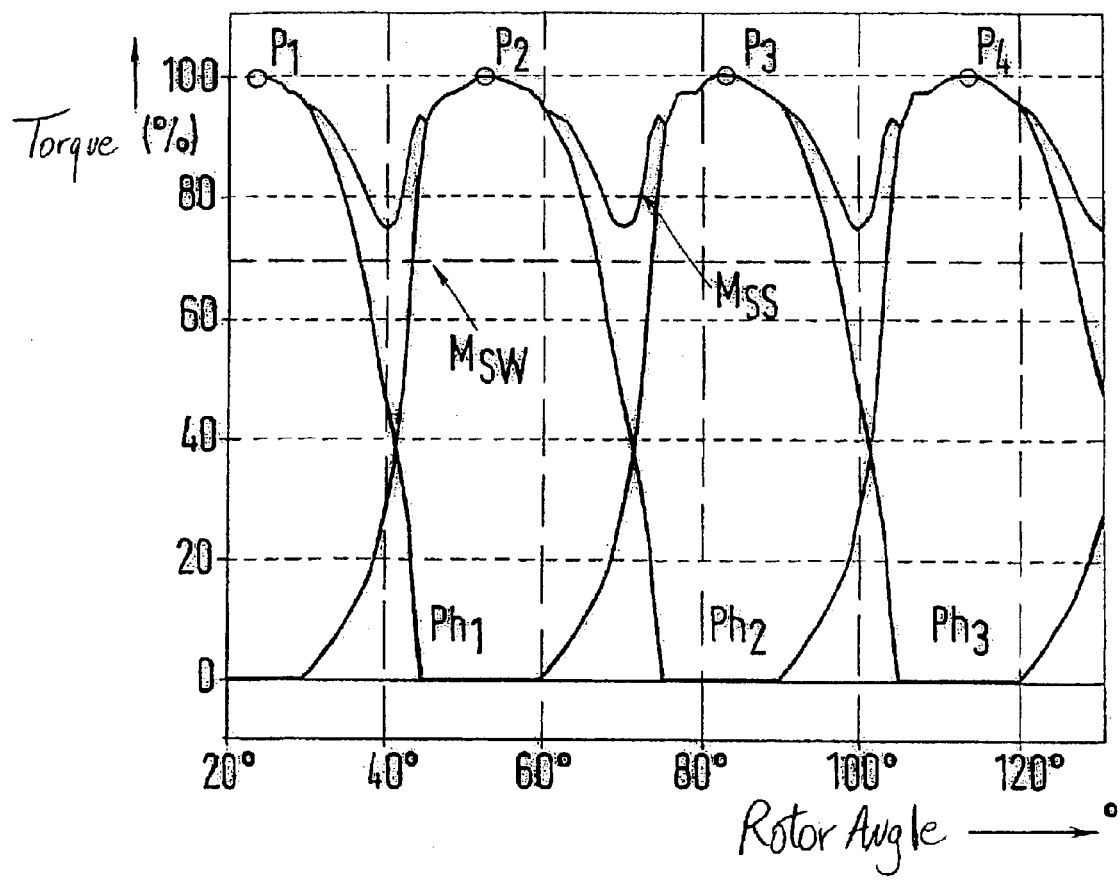
FIG. 1 shows the summed torque of a three-phase, four-pole electric motor as a function of the rotor angle at constant current.

FIG. 1 shows a position-dependent torque-position characteristic of a switched reluctance motor including 4 rotor poles and 3 phases. In this motor topology, summed torque $M_{SS}$ in the overlap regions between adjacent phases $Ph_1$ and $Ph_2$, $Ph_3$ and $Ph_4$, etc., shows distinct lowerings, that is, minima which, from a certain torque on, may no longer be compensated for by increasing the phase current. In other motor topologies, for example, 6 rotor poles and 4 phases, the summed torque shows maxima and minima in the overlap region between two phases where only one phase is energized. In any case, the electric motor is one which operates with a position-dependent summed torque.

In an exemplary embodiment, the maxima of summed torque $M_{SS}$ lie in positions $P_1$ through $P_4$ in which only one phase $Ph_1$, $Ph_2$ or $Ph_3$ is energized. Between these maxima, there are minima as shown by the torque-position characteristic illustrated in FIG. 1. Plotted threshold torque $M_{SW}$ is selected to be about 70% of maximum peak torque M 100%.

Figure 2:
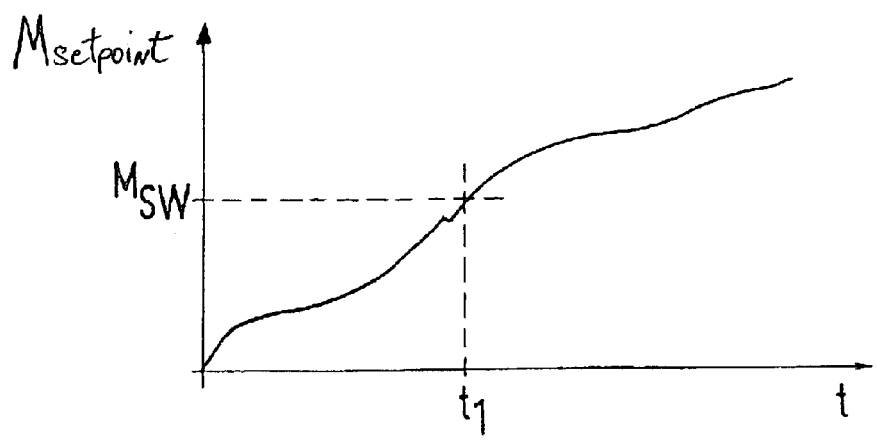
FIG. 2 shows the torque-time characteristic curve of the electric motor.

As FIG. 2 shows, setpoint value $M_{setpoint}$ has associated therewith a continuously increasing setpoint value-time curve which represents the timing during an actuating movement of the actuating drive, that is, of the starting of the electric motor. In this context, predetermined threshold torque $M_{SW}$ is reached after a time $t_1$.

Figure 3:
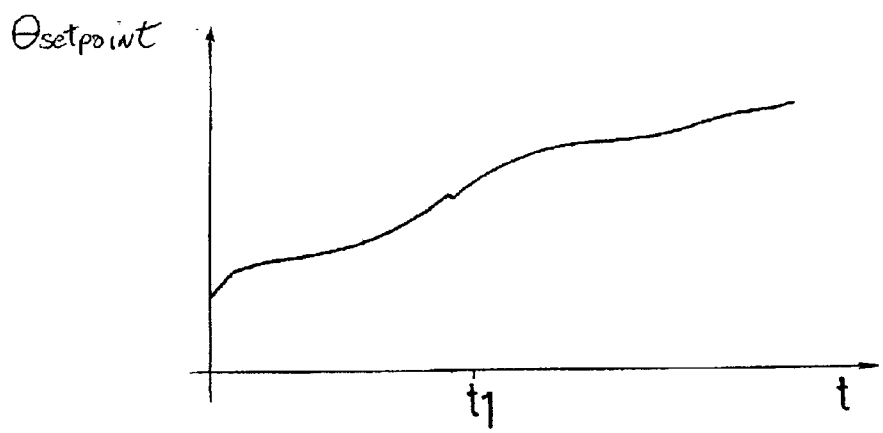
FIG. 3 shows the associated setpoint position as the control signal of the torque controller as a function of time.
Figure 4:
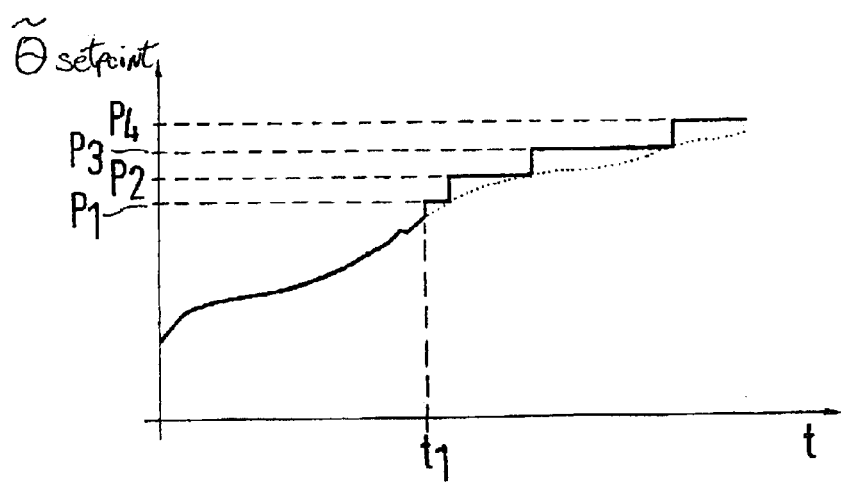
FIG. 4 shows the setpoint position that is changed by a computing circuit as a function of time and torque and fed to the position controller.

FIG. 3 indicates the profile followed by setpoint position $\theta_{setpoint}$, which is emitted by the torque controller as a control signal for the position controller, as a function of a corresponding time lapse. Finally, FIG. 4 shows how setpoint position $\theta_{setpoint}$ turns into changed setpoint position $\theta_{setpoint}$ from instant $t_1$ on, that is, from the exceeding of predetermined threshold torque $M_{SW}$ on. When threshold torque $M_{SW}$ is reached, then changed setpoint position $\theta_{setpoint}$ changes abruptly to a value which is associated with maximum $P_1$. In this manner, it is achieved that the following minimum of the summed torque is rapidly and reliably passed. The increased value of changed setpoint position $\theta_{setpoint}$ is maintained until position $P_2$ is reached. Then, the abrupt changing of changed setpoint position $\theta_{setpoint}$ is repeated until finally a position $P_1$, $P_2$, $P_3$ or $P_4$ is reached which corresponds to predetermined setpoint value $M_{setpoint}$ and the electric motor is stopped. In this context, it may be seen how, as the summed torque further increases, the maxima increase as well and determine the abrupt changes in the curve according to FIG. 4.

Figure 5:
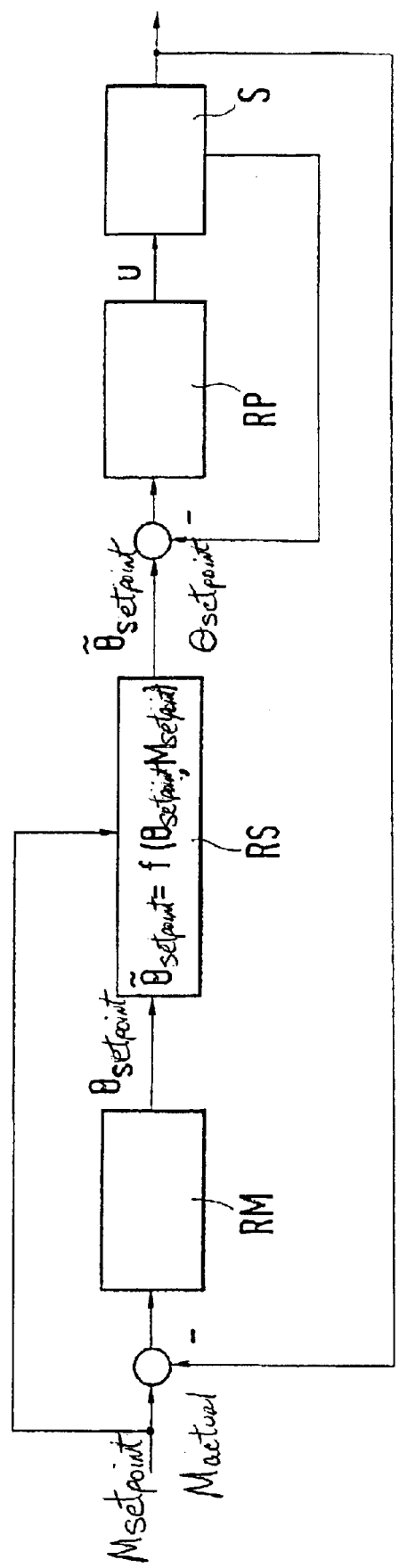
FIG. 5 shows the control loop of the electric motor, including the torque controller, computing circuit, position controller and the controlled system.

The entire control loop for the electric motor is schematically depicted in FIG. 5. Torque-dependent setpoint value $M_{setpoint}$, together with torque-dependent actual value $M_{actual}$, is fed a torque controller RM which emits a setpoint position $\theta_{setpoint}$ as a control signal to a subsequent computing circuit RS, the control signal following the curve shown in FIG. 3. Setpoint value $M_{setpoint}$ is also fed to computing circuit RS which, taking into account threshold $M_{SW}$, converts the curve to a changed curve for a changed setpoint position $\theta_{setpoint}$ according to FIG. 4. A comparison of the curves illustrated in FIGS. 3 and 4 shows that the curve of changed setpoint position $\theta_{setpoint}$ remains unchanged compared to the curve of setpoint position $\theta_{setpoint}$ of FIG. 3 until threshold torque $M_{SW}$ is reached at instant $t_1$. After that, however, changed setpoint position $\theta_{setpoint}$ is changed abruptly, the abrupt change is selected by computing circuit RS in such a manner that it corresponds to the position of the following, increasing maximum of summed torque $M_{SS}$. In this manner, it is guaranteed that the minimum occurring between maxima $P_1$ and $P_2$ is rapidly and reliably passed. As the curve according to FIG. 4 shows, this abrupt change of changed setpoint position $\theta_{setpoint}$ is repeated each time a minimum is passed until the electric motor is finally stopped in one of positions $P_1$ through $P_4$ when setpoint value $M_{setpoint}$ is reached.

What is claimed is:

1. An actuating drive, comprising:

a torque controller;

a controlled system;

an electronically commutated electric motor that operates with a position-dependent summed torque and that, using the torque controller and the controlled system, is adjusted to a selectable torque-dependent setpoint value according to a continuously increasing torque-time characteristic curve, the torque controller receiving a torque-dependent actual value of the electronically commutated electric motor in addition to the selectable torque-dependent set point value to derive a control signal; and a position controller downstream of the torque controller;

wherein the torque controller is configured to emit the control signal as a setpoint position and feeds it to the position controller, until a predetermined threshold torque that is smaller than a maximum torque of the electronically commutated electric motor is reached, the setpoint position is fed unchanged to the position controller and is used together with an actual position of the electronically commutated electric motor to derive the control signal for the controlled system, and subsequent to exceeding the predetermined threshold torque, the setpoint position is fed to the downstream position controller as a changed setpoint position until a predetermined setpoint position is reached, the changed setpoint position being repeatedly increased in an abrupt manner according to an increase in following peak values of an increasing summed torque.

2. The actuating drive of claim 1, wherein the threshold torque is equivalent to about 70% of the maximum torque of the electronically commutated electric motor.

3. The actuating drive of claim 1, wherein after each abrupt increase of the changed setpoint position, a value of the changed setpoint position remains constant until an unchanged setpoint position that is associated with a following maximum of the summed torque is reached and then changes abruptly again.

4. The actuating drive of claim 1, wherein the changed setpoint position is a function of the position signal of the torque controller, the predetermined torque-dependent setpoint value, and the predetermined threshold torque.

5. The actuating drive of claim 1, further comprising:

a computing circuit that receives the control signal of the torque controller as a setpoint position and the setpoint value, the computing circuit being arranged between the torque controller and the position controller and configured to convert the setpoint position to the changed setpoint position as a function of the setpoint position and the setpoint value taking into account the threshold torque, the computing circuit feeding the setpoint position to the position controller.

* * * * *

UNITED STATES PATENT AND TRADEMARK OFFICE
CERTIFICATE OF CORRECTION

PATENT NO.       : 6,891,345 B2
APPLICATION NO.  : 10/311953
DATED            : May 10, 2005
INVENTOR(S)      : Axel Schumacher It is certified that error appears in the above-identified patent and that said Letters Patent is hereby corrected as shown below:

Column 3, line 28, change "$\Theta_{setpoint}$" to -- $\tilde{\Theta}_{setpoint}$ --;

Column 3, line 31, change "$\Theta_{setpoint}$" to -- $\tilde{\Theta}_{setpoint}$ --;

Column 3, line 35, change "$\Theta_{setpoint}$" to -- $\tilde{\Theta}_{setpoint}$ --;

Column 3, line 36, change "$\Theta_{setpoint}$" to -- $\tilde{\Theta}_{setpoint}$ --;

Column 3, line 53, change "$\Theta_{setpoint}$" to -- $\tilde{\Theta}_{setpoint}$ --;

Column 3, line 55, change "$\Theta_{setpoint}$" to -- $\tilde{\Theta}_{setpoint}$ --;

Column 3, line 59, change "$\Theta_{setpoint}$" to -- $\tilde{\Theta}_{setpoint}$ -- and Column 4, line 2, change "$\Theta_{setpoint}$" to -- $\tilde{\Theta}_{setpoint}$ --.

Signed and Sealed this

Twenty-eighth Day of November, 2006

JON W. DUDAS
*Director of the United States Patent and Trademark Office*